United States Patent [19]

Houlihan et al.

[11] 3,860,649

[45] Jan. 14, 1975

[54] LITHIATED N-BENZYL BENZAMIDES

[75] Inventors: William J. Houlihan, Mountain Lakes; Jeffrey Nadelson, Lake Parsippany, both of N.J.

[73] Assignee: Sandoz Wander, Inc., Hanover, N.J.

[22] Filed: Sept. 21, 1973

[21] Appl. No.: 399,430

Related U.S. Application Data

[62] Division of Ser. No. 247,545, April 26, 1972, Pat. No. 3,787,495.

[52] U.S. Cl. ............................................. 260/566 F
[51] Int. Cl. ........................................... C07c 119/00
[58] Field of Search ...................... 260/566 F, 588 P

[56] References Cited
UNITED STATES PATENTS

| | | | |
|---|---|---|---|
| 2,355,257 | 8/1944 | Badertscher | 260/566 F X |
| 3,442,791 | 5/1969 | Gonzalez | 260/556 F X |

*Primary Examiner*—Leon Zitver
*Assistant Examiner*—Gerald A. Schwartz
*Attorney, Agent, or Firm*—Gerald D. Sharkin; Robert S. Honor

[57] ABSTRACT

Substituted benzyl-10,11-dihydro and corresponding 10,11-unsaturated dibenzocycloheptenols, e.g., 5-(a-amino benzyl)-10,11-dihydro-5H-dibenzo[a,d]cyclohepten-5-ol, useful as diuretics, prepared from a series of reactions starting with a dibenzocycloheptenone and lithiated N-benzyl benzamides.

1 Claim, No Drawings

LITHIATED N-BENZYL BENZAMIDES

This is a division of application Ser. No. 247,545, filed Apr. 26, 1972, now U.S. Pat. No. 3,787,495.

This invention pertains to novel substituted benzyl dibenzocycloheptenols, acid addition salts thereof, and processes for their preparation.

More particularly, the compounds of this invention may be represented by the formula:

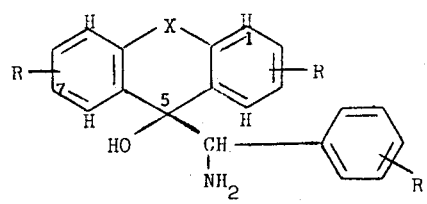

(I)

where
X represents $CH_2$—$CH_2$ or CH=CH, and
R represents H or halo of atomic weight from about 19 to about 36.

The compounds of formula (I) may be prepared from the compounds of formula (II) in accordance with the following reaction scheme:

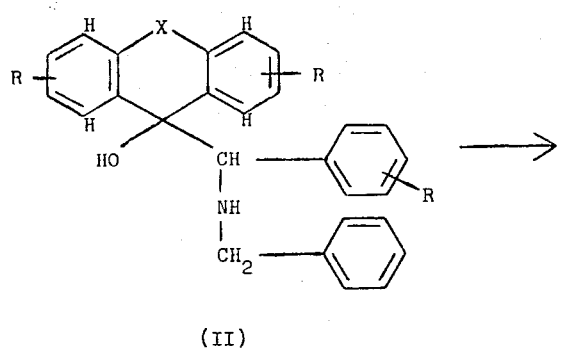

where
X and R are as defined above.

In accordance with this process, compounds (II) are hydrogenated at about 40–60 lbs. per sq. inch, preferably about 50 lbs. per sq. inch, in alcoholic solvents, preferably lower alkanols such as ethanol, at a temperature of about 20°–70°C., conveniently room temperature. The reaction may be allowed to proceed until about 1 equivalent of hydrogen is absorbed. In the event the hydrated form of the final product (I) is obtained, such form may be converted to the unhydrated form by conventional techniques.

The compounds of formula (II) may be prepared from the compounds of formula (III) according to the following reaction scheme:

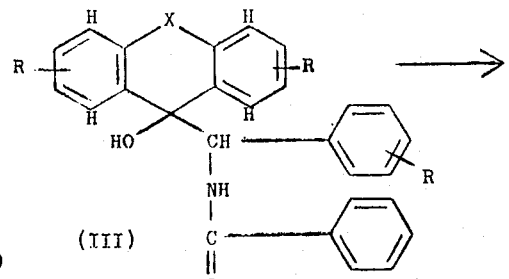

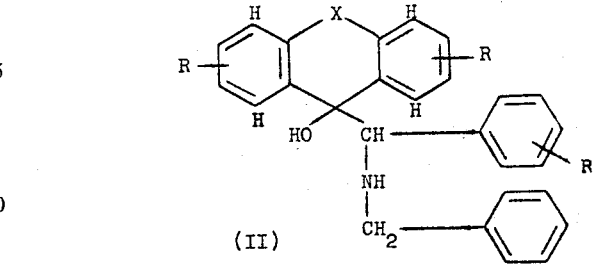

where
X and R are as defined above.

Compounds (II) are thus prepared by treating compounds (III) with a metal hydride reducing agent such as lithium aluminum hydride in ether solvents such as ethyl ether or tetrahydrofuran at a temperature of about 50°–150°C., conveniently at reflux temperature of the system, for a period of about 1–8 hours, preferably for about 3–5 hours.

Compounds (III) are obtained according to the following reaction scheme:

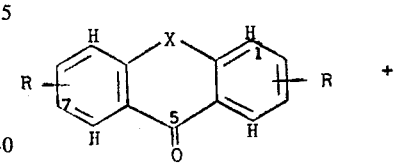

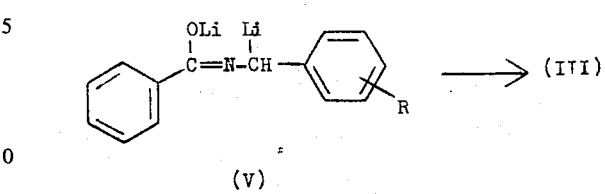

where
X and R are as defined above.

In accordance with this process for making compounds (III), compounds (IV) and (V) are condensed in inert solvents such as ethers, e.g., diethyl ether or tetrahydrofuran, or hydrocarbons such as hexane, heptane and the like, optionally in inert atmosphere, e.g. nitrogen, at a temperature of about −10°C. to +10°C., preferably about 0°C., for about 1–8 hours, preferably about 3–5 hours. The resulting aduct is then subjected to conventional hydrolysis to obtain the compounds (III).

Compounds (V) are prepared from the corresponding benzyl benzamides of the formula

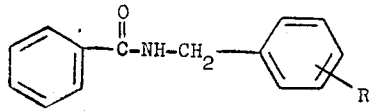

(VI)

where R is as defined above by lithiating the latter by use of lower alkyl or aryl lithium compound such as n-butyl lithium in inert hydrocarbon or ether solvents such as those mentioned above useful in the condensation of compounds (IV) and (V). The lithiation is preferably performed at the same temperatures and at the same periods of time as indicated above respecting said condensation. The dilithiated compound (V) is normally not recovered from the lithiation process but is used directly in the preparation of compoounds (III).

In each of the above reactions, the particular temperature and solvent utilized is not critical. Additionally, except where otherwise indicated, the products of each of said reactions are recovered by conventional techniques such as crystallization, filtration, trituration and the like.

Certain of the compounds of formulas (IV) and (VI) are known and may be prepared according to methods disclosed in the literature. The compounds of formulas (IV) and (VI) not specifically disclosed may be prepared from methods analogous to those in the literature from known compounds.

Certain of the compounds of formulas (I), (II) and (III) exist in racemic form or in the form of optically active isomers. The separation and recovery of the respective isomers may be readily accomplished employing conventional techniques, and such isomers are included within the scope of the invention.

Compounds (I) and (II) may exist in the form of their acid addition salts. Said salts and their respective free bases may be converted from one to the other by conventional techniques, and are chemically interchangable for purposes of the above-described processes.

The compounds of formula (I) are useful because they possess pharmacological properties in animals such as mammals. In particular, the compounds may be used as diuretics as indicated by their activity in rats orally administered 5–50 mg/kg and dogs intravenously administered 5 mg/kg of animal body weight. The rats are unanethetized male Wistar rats (240–360 gm.) which are fasted overnight. Six animals are used for each of the test substance, chlorothiazide and control groups. These compounds are suspended in 1.5% carboxymethyl cellulose for oral administration. The concentration is adjusted so that 1 ml/100 gms. body weight provides the desired dosage. The animals also receive 2 ml/100 gm. body weight of saline (p.o.) to insure adequate hydration (total volume equals 3 ml/100 gm. body weight). Data of test agents are compared with those obtained from a chlorothiazide group (25 mg/kg) and a control group (1 ml. 1.5% carboxymethyl cellulose, 2 ml. saline/100 gm. body weight). Complete bladder evacuation is effected at zero time. Urine is collected for three hours in metabolism cages. Volumes are recorded and samples are taken for electrolyte ($Na^+$ and $K^+$) measurement by flame photometry. The dog test animal is anethethized and urine outflow is determined by measuring the outflow from the catheterized ureters with the aid of a standard dropcounter.

For such usage, the compounds of formulas (I) may be combined with a pharmaceutically acceptable carrier or adjuvant, and may be administered orally in such forms as tablets, capsules elixers, suspensions and the like, or parenterally in the form of an injectable solution or suspension. The dosage will vary depending upon the mode of administration utilized and the particular compounds employed.

As indicated above, the compounds of formula (I) may be similarly administered in the form of their non-toxic pharmaceutically acceptable acid addition salts. Such salts possess the same order of activity as the free base and are included within the scope of the invention. Representative of such salts are the mineral acid salts, such as hydrochloride, hydrobromide, sulfate, phosphate and the like and the organic acid salts, such as the succinate, benzoate, acetate, ptoluenesulfonate, benzensulfonate and the like.

As noted above, the compounds of formulas (I), (II), and (III) exist as optical isomers. In some cases, greater pharmacological activity or other beneficial attribute may be found for a particular isomer and in such instances administration of such isomer may be preferred.

In general, satisfactory results are obtained when the compounds (I) are administered orally at a daily dosage of from about 4–400 mg/kg of animal body weight, preferably given in divided doses, two to four times a day or in sustained release form. For most large mammals (e.g., primates) the total daily dosage is from about 300–3,000 mg. per day. Dosage forms suitable for internal use comprise from about 75–1,500 mg. of active compound in intimate admixture with a solid or liquid pharmaceutically acceptable carrier or diluent.

A tablet containing 75 mg. of 5($\alpha$-amino benzyl)110-,11-dihydro-5H-dibenzo[a,d]cyclohepten-5-ol hydrochloride hemihydrate and 225 mg. of lactose is prepared by conventional techniques and is useful in effecting diuresis in accordance with this invention at a dosage of one capsule two to four times a day.

EXAMPLE 1.

5-(N-benzoyl-$\alpha$-amino benzyl)-10,11-dihydro-5H-dibenzo[a,d]cyclohepten-5-ol To a flask equipped with a stirrer, dropping funnel, condenser and gas inlet tube maintained under a nitrogen atmosphere there is added at room temperature 42.2 g. (0.2 mole) of N-benzyl benzamide in 450 ml. of dry tetrahydrofuran. The flask is immersed in an ice bath and cooled to an internal temperature of 5°C. Stirring is initiated and 275 ml. of 1.6 M n-butyl lithium (0.44 mole) in hexane is added dropwise in ca. 1 hour maintaining the temperature below 8°C. The resulting blue-black mixture is stirred 1 hour at room temperature, cooled to an internal temperature of 5°C. and 45.7 g. (0.22 mole) of 10,11-dihydro-5H-dibenzo [a,d-]cyclohepten-5-one in 200 ml. dry ether is added in ca. 1 hour maintaining the temperature below 8°C. The reaction mixture is stirred 2 additional hours at 0°C. and then poured onto 1 liter of ice-water. The layers are separated and the organic phase washed with saturated sodium chloride solution, dried over magnesium sulfate, filtered and evaporated in vacuo to give a solid that is purified by trituration with methylene chloride-ether (1:1) to give 5-(N-benzoyl-$\alpha$-amino benzyl)-10,11-dihydro-5H-dibenzo[a,d]cyclohepten-5-ol; m.p. 198°–200°C.

When the above described process is carried out and in place of N-benzyl benzamide there is used N-p- chlorobenzyl benzamide, there is obtained through the corresponding dilithiated intermediate 5-(N-benzoyl-α-amino-p-clorobenzyl)-10,11-dihydro-5H-dibenzo[a,d]cyclohepten-5-ol.

When the above detailed process is carried out and in place of 10,11-dihydro-5H-dibenzo[a,d]cyclohepten-5-one there is used a. 5H-dibenzo[a,d]cyclohepten-5-one, or b. 10,11-dihydro-7-chloro-5H-dibenzo[a,d]cyclohepten-5-one. there is obtained through the corresponding dilithiated intermediate a. 5-(N-benzoyl-α-amino benzyl)-5H-dibenzo[a,d]cyclohepten-5-ol, or b. 5-(N-benzoyl-α-amino benzyl)-7-chloro-10,11-dihydro-5H-dibenzo[a,d]cyclohepten-5-ol, respectively.

EXAMPLE 2.
5-(N-benzyl-α-amino benzyl)-10,11-dihydro-5H-dibenzo[a,d]cyclohepten-5-ol hydrochloride.

To a suspension of 3.95 g. (0.104 mole) of lithium aluminum hydride and 200 ml. of dry tetrahydrofuran under nitrogen is added 22 g. (0.052 mole) of 5-(N-benzoyl-α-amino benzyl)-10,11-dihydro-5H-dibenzo[a,d]cyclohepten-5-ol as a solid in portions. The resulting mixture is refluxed for 3½ hours, cooled to 0°C. and quenched by the addition ethyl acetate and water. The resulting mixture is dried over anhydrous magnesium sulfate, filtered and evaporated in vacuo. The residue is dissolved in ether and treated with gaseous HCl and the resulting solid filtered and recrystallized from methylene chloride-ether (1:1) to give 5-(N-benzyl-α-amino benzyl)-10,11-dihydro-5H-dibenzo[a,d]cyclohepten-5-ol hydrochloride, m.p. 197°–205°C.

When the above process is carried out and in place of 5-(N-benzoyl-α-amino benzyl)-10,11-dihydro-5H-dibenzo[a,d]cyclohepten-5-ol there is used a. 5-(N-benzoyl-α-amino-p-chlorobenzyl)-10,11-dihydro-5H-dibenzo [a,d]cyclohepten-5-ol, b. 5-(N-benzoyl-α-amino benzyl)-5H-dibenzo[a,d]cyclohepten-5-ol, or c. 5-(N-benzoyl-α-amino benzyl)-7-chloro-10,11-dihydro-5h-dibenzo[a,d]cyclohepten-5-ol, there is obtained a. 5-(N-benzyl-α-amino-p-chlorobenzyl)-10,11-dihydro-5H-dibenzo [a,d]cyclohepten-5-ol hydrochloride, b. 5-(N-benzyl-α-amino benzyl)-5H-dibenzo[a,d]cyclohepten-5-ol hydrochloride, or c. 5-(N-benzyl-α-amino benzyl)-7-chloro-10,11-dihydro-5H-dibenzo[a,d]cyclohepten-5-ol hydrochloride, respectively.

EXAMPLE 3.
5-(α-amino benzyl)-10,11-dihydro-5H-dibenzo[a,d]cyclohepten-5-ol hydrochloride hemihydrate.

A mixture of 10.7 g. (0.024 mole) of 5-(N-benzyl-α-amino benzyl)-10,11-dihydro-5H-dibenzo[a,d]cyclohepten-5-ol hydrochloride, 3.2 g. of 10% palladium-on-carbon and 110 ml. of ethanol is treated with hydrogen gas at 50 p.s.i. and room temperature. The reaction is stopped when one equivalent of hydrogen is absorbed. The catalyst is removed by filtration and the solvent is evaporated in vacuo. The residue is recrystallized from (1:1) ethanol-acetone to give 5-(α-amino benzyl)-10,11-dihydro-5H-dibenzo[a,d]cyclohepten-5-ol hydrochloride hemihydrate; m.p. 204°–208°C.

When the above process is carried out and in place of 5-(N-benzyl-α-amino benzyl)-10,11-dihydro-5H-dibenzo[a,d]cyclohepten-5-ol hydrochloride there is used a. 5-(N-benzyl-α-amino-p-chlorobenzyl)-10,12-dihydro-5H-dibenzo [a,d]cyclohepten-5-ol hydrochloride, b. 5-(N-benzyl-α-amino benzyl)-5H-dibenzo[a,d]cyclohepten-5-ol hydrochloride, or c. 5-(N-benzyl-α-amino benzyl)-7-chloro-10,11-dihydro-5H-dibenzo[a,d]cyclohepten-5-ol hydrochloride.

there is obtained a. 5-(α-amino-p-chlorobenzyl)-10,11-dihydro-5H-dibenzo[a,d]cyclohepten-5-ol hydrochloride hemihydrate, b. 5-(α-amino benzyl)-5H-dibenzo[a,d]cyclohepten-5-ol hydrochloride hemihydrate, or c. 5-(α-amino benzyl)-7-chloro-10,11-dihydro-5H-dibenzo[a,d]cyclohepten-5-ol hydrochloride hemihydrate, respectively.

What is claimed is:

1. A compound of the formula

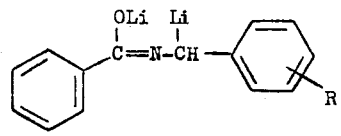

where R is a hydrogen atom or halo of atomic weight from about 19 to about 36.

* * * * *